(12) United States Patent
Fattal et al.

(10) Patent No.: US 11,132,563 B2
(45) Date of Patent: Sep. 28, 2021

(54) METHOD FOR IDENTIFYING OBJECTS IN AN IMAGE OF A CAMERA

(71) Applicants: Conti Temic microelectronic GmbH, Nuremberg (DE); Continental Teves AG & Co. OHG, Frankfurt am Main (DE)

(72) Inventors: Ann-Katrin Fattal, Frankfurt (DE); Michelle Karg, Lindau (DE); Christian Scharfenberger, Lindau (DE)

(73) Assignees: Conti Ternie microelectronic GmbH, Nuremberg (DE); Continental Teves AG & Co. OHG, Frankfurt am Main (DE)

(*) Notice: Subject to any disclaimer, the term of this patent is extended or adjusted under 35 U.S.C. 154(b) by 13 days.

(21) Appl. No.: 16/476,378

(22) PCT Filed: May 17, 2018

(86) PCT No.: PCT/DE2018/200049
§ 371 (c)(1),
(2) Date: Jul. 8, 2019

(87) PCT Pub. No.: WO2018/215031
PCT Pub. Date: Nov. 29, 2018

(65) Prior Publication Data
US 2019/0354783 A1    Nov. 21, 2019

(30) Foreign Application Priority Data
May 23, 2017   (DE) .................... 10 2017 208 718.8

(51) Int. Cl.
*G06K 9/00*   (2006.01)
*G06K 9/32*   (2006.01)
*G06K 9/62*   (2006.01)

(52) U.S. Cl.
CPC ....... *G06K 9/00805* (2013.01); *G06K 9/3233* (2013.01); *G06K 9/6262* (2013.01); *G06K 9/6267* (2013.01)

(58) Field of Classification Search
CPC .......... G06K 9/00362; G06K 9/00664; G06K 9/00805; G06K 9/3233; G06K 9/6262; G06K 9/6267
(Continued)

(56) References Cited

U.S. PATENT DOCUMENTS 10,460,180 B2 * 10/2019 Gao ................... G06K 9/627
2016/0162743 A1   6/2016 Chundrlik, Jr. et al.
(Continued)

FOREIGN PATENT DOCUMENTS

DE   198 45 568   10/1999
EP   3 261 017    12/2017

OTHER PUBLICATIONS

English translation of the International Search Report of the International Searching Authority for International Application PCT/DE2018/200049, dated Aug. 13, 2018, 2 pages, European Patent Office, HV Rijswijk, Netherlands.
(Continued)

*Primary Examiner* — Daniel G Mariam
(74) *Attorney, Agent, or Firm* — W. F. Fasse

(57) ABSTRACT

A method for identifying objects begins with capturing an image of an external environment of a vehicle using a capturing unit arranged on the vehicle. An object region within the image is located by a region proposal process, and an object within the object region is classified in a classification process. The region proposal process and/or the classification process is/are implemented in a convolutional (Continued)

neural network. External prior information highlighting a possible object region is supplied to the region proposal process.

22 Claims, 3 Drawing Sheets

(58) Field of Classification Search
USPC .................................................. 382/103, 224
See application file for complete search history.

(56) References Cited

U.S. PATENT DOCUMENTS

2017/0124409 A1   5/2017   Choi et al.
2017/0124476 A1   5/2017   Levinson et al.
2019/0294896 A1*  9/2019   Jia ...................... G06K 9/00369

OTHER PUBLICATIONS

PCT International Preliminary Report on Patentability including English Translation of PCT Written Opinion of the International Searching Authority for International Application PCT/DE2018/200049, dated Nov. 26, 2019, 7 pages, International Bureau of WIPO, Geneva, Switzerland.
German Search Report for German Patent Application No. 10 2017 208 718.8, dated Apr. 25, 2018, 7 pages, German Patent and Trademark Office, Muenchen, Germany, with partial English translation, 5 pages.
Taewan Kim et al., "Robust Detection of Non-Motorized Road Users Using Deep Learning on Optical and LIDAR Data", 2016 IEEE 19th International Conference on Intelligent Transportation Systems (ITSC), Nov. 1, 2016, XP033028358, pp. 271 to 276.
Clemens-Alexander Brust et al., "Convolutional Patch Networks with Spatial Prior for Road Detection and Urban Scene Understanding", VISAPP 2015, arxiv.org, Cornell University Library, Ithaca, NY, Feb. 23, 2015, XP080787653, 9 pages.
J.R.R. Uijlings et al., "Selective Search for Object Recognition", International Journal of Computer Vision, vol. 104, n. 2, 2013, pp. 154 to 171.
Shaoqing Ren et al., "Faster R-CNN: Towards Real-Time Object Detection with Region Proposal Networks", 29th Annual Conference on Neural Information Processing Systems 2015, ISBN: 78-1-5108-2502-4, pp. 91 to 99.
Joseph Redmon et al., "You Only Look Once: Unified, Real-Time Object Detection", Proceedings of the IEEE Conference on Computer Vision and Pattern Recognition (CVPR 2016), Jun. 27, 2016, pp. 779 to 788.
Wei Liu et al., "SSD: Single Shot MultiBox Detector", European Conference on Computer Vision, Springer-Verlag, arXiv:1512.02325v5, Dec. 29, 2016, pp. 21 to 37.
Pierre Sermanet et al., "OverFeat: Integrated Recognition, Localization and Detection using Convolutional Networks", arXiv preprint arXiv: 1312.6229v4, Feb. 24, 2014, pp. 1 to 16.
Abhinav Shrivastava et al., "Contextual Priming and Feedback for Faster R-CNN", 2016 European Conference on Computer Vision, pp. 330 to 348.

* cited by examiner

METHOD FOR IDENTIFYING OBJECTS IN AN IMAGE OF A CAMERA

FIELD OF THE INVENTION

The invention relates to a method for identifying objects in an image of a camera.

BACKGROUND INFORMATION

The process of detecting objects such as, for example, vehicles in road traffic in an image or in a series of images of a front camera which is mounted behind a windshield of a vehicle is known. The detection of objects in image data is typically divided into two steps: firstly, possible object regions are located, and this is then followed by a classification, in which a group affiliation of objects within the object regions is determined.

In order to locate the object regions, known detection algorithms of so-called "region proposal" methods such as, for example "selective search", are used. The locating of potential object regions serves to increase the efficiency or respectively the performance of downstream detection and classification stages. An appropriate method is, for example, described in the scientific article "Selective Search for Object Recognition" by J. R. Uijlings et al from 2013 (published in the "International Journal of Computer Vision", vol. 104, n. 2, pages 154 to 171).

The latest detection algorithms work with neural networks, in which, in addition to the classification, the region proposal method is also integrated and a common learning method is applied to the weights. Corresponding methods are, for example, described in the following scientific articles: S. Ren et al. (2015): "Faster r-cnn: Towards real-time object detection with region proposal networks", 29th Annual Conference on Neural Information Processing Systems 2015, pages 91-99; ISBN: 78-1-5108-2502-4; J. Redmon et al. (2016): "You only look once: Unified, real-time object detection", Proceedings of the IEEE Conference on Computer Vision and Pattern Recognition, pages 779-788; W. Liu et al. (2016): "SSD: Single shot multibox detector", European Conference on Computer Vision, pages 21-37, Springer-Verlag; P. Sermanet et al. (2014): "Overfeat: Integrated recognition, localization and detection using convolutional networks", arXiv preprint arXiv: 1312.6229.

A locating stage and a classification stage of an object detection chain are depicted in a common system. In particular, both stages can be based on a common set of features and additionally contain further processing steps in a specialized manner for object detection or classification. In these approaches, the locating of the object regions within an image is realized by a so-called "sliding window" approach with object scores for each sliding window (a "window" in this case means a section of the sensor information, e.g. image section).

The windows with the highest scores are forwarded to the classification stage of the network. The score is made up of features such as edges or corners and does not consider the position of the window in the image. This can be clearly explained based on the following example: a car in the sky is assumed to be just as probable as a car on a drivable area, since the network merely observes signals for each sliding window and does not consider any global information such as the position. This is one of the greatest disadvantages of existing methods and can lead to a false detection which can trigger an incorrect braking operation in a critical application such as Emergency Brake Assist.

In the article "Contextual priming and feedback for faster r-cnn" by A. Shrivastava and A. Gupta from 2016 (European Conference on Computer Vision, pages 330 to 348) an approach is presented which communicates, by means of an integrated segmenting approach, the locality of the section to be examined in the image to the region proposal network (alias the region proposal stage) as well as the classification stage. The system is trained end-to-end, since both the segmenting and the locating and classification are established via neural networks. Improvements in the detection rate of the entire system become apparent. One disadvantage of this system, however, is the fact that labels for the segmenting and for the objects have to be available for the training, and it is solely possible to work on image material (2D signals).

SUMMARY OF THE INVENTION

It is an object of the present invention to provide an efficient method for identifying objects in an image captured by a camera, which in particular makes possible an improved locating of object regions.

The above object can be achieved by the subject matter of the invention as set forth herein.

The present invention proposes a generic approach, in accordance with which external information of any kind, which is referred to below as "prior information", is integrated into a CNN-based object detection approach, with the aim of ensuring that only a minimum amount of retraining of upper network layers is necessary, and the influence on the computation time of the entire system is minimal. CNN stands for convolutional neural network. The prior information can in particular be global information, e.g. temporary information and/or location information. The feature "external prior information" can mean that the prior information is not only generated by an evaluation of a captured image itself or by the CNN, but is also provided by an external source, e.g. by a further sensor of the vehicle, e.g. a radar sensor, a lidar sensor or a ultrasonic sensor, an infrared camera or a laser scanner.

Unlike the method presented by Shrivastava and Gupta in 2016 and described above, in which location information is generated by the CNN itself ("internal" information), it is now possible, according to the present invention, to separate the training of a function for calculating the prior information from the training of the network, by means of the external prior information. As a result, a broader range of prior information can be comprised or respectively can be integrated into the region proposal method in order to locate object regions. For example, it is possible to extend this information to temporal information or to apply attention modeling. Furthermore, a generalization regarding any form of the prior information is made possible, wherein a minimalistic approach to the running time in terms of training outlay and computation time is simultaneously provided.

According to a first aspect of the invention, a method for identifying objects in an image of a capturing unit, for example a camera, a radar unit or an ultrasound unit, is provided. The invention is frequently described below—without being restricted thereto—with reference to a camera as the capturing unit. The following explanations in connection with a camera also apply analogously to other capturing units.

An image is captured according to the method according to the invention. In particular, an image of an external environment of a vehicle is captured using a camera arranged on the vehicle, a radar unit or an ultrasound unit.

The viewing direction in particular of the vehicle camera can be selected at will. The vehicle camera can thus be arranged, for example, in the area behind a windshield of the vehicle and can look forward through said windshield in the direction of travel. This is, however, purely indicated by way of example. Likewise, the vehicle camera can, for example, be arranged in the area behind a rear window of the vehicle and can look through said rear window in a backward direction. The vehicle is, for example, a motor vehicle such as a car, bus or truck, a rail vehicle, an aircraft or a watercraft.

Furthermore, an object region within the image is located by means of a region proposal method ("region proposal stage"), and an object within the object region is classified ("classification stage"). The region proposal method and/or the classification is/are integrated into a convolutional neural network (CNN). In particular, the region proposal method and the classification can be integrated into a common convolutional neural network. In particular, a common learning method can be applied to the weights. Consequently, the region proposal stage and the classification stage of an object detection chain (=locating+classifying) can, in particular, be depicted in a common system. Both stages can be based on a common set of features and can additionally contain further processing steps in a specialized manner for the object detection or classification.

How an appropriate integration, architecture or respectively method can be configured is, for example, described in the following scientific articles: S. Ren et al. (2015): "Faster r-cnn: Towards real-time object detection with region proposal networks", 29th Annual Conference on Neural Information Processing Systems 2015, pages 91-99; ISBN: 78-1-5108-2502-4; J. Redmon et al. (2016): "You only look once: Unified, real-time object detection", Proceedings of the IEEE Conference on Computer Vision and Pattern Recognition, pages 779-788; W. Liu et al. (2016): "SSD: Single shot multibox detector", European Conference on Computer Vision, pages 21-37, Springer-Verlag; P. Sermanet et al. (2014): "Overfeat: Integrated recognition, localization and detection using convolutional networks", arXiv preprint arXiv: 1312.6229.

In particular, it can be provided according to the present invention that external prior information highlighting or proposing a possible object region, in particular global prior information, is to be supplied to the convolutional neural network (CNN). In particular, objects or respectively the properties thereof within the image captured by the camera can be highlighted by the prior information, such that an image region containing the indicated objects is likewise highlighted for the regional proposal method and, as a result, is located with increased probability by the regional proposal method as an object region, within which the classification is subsequently performed.

In particular, the prior information constitutes additional information which highlight properties of objects and/or properties of the environments associated with the objects within the image captured by the camera. In addition to the highlighting of an object, it is also helpful to know the environment of the object. The road on which a car can be located, in contrast to the sky, is indicated as an example. As a result, the regional proposal method is assisted with identifying an object region in the image captured by the camera, in which object region an object which is to be or which can be classified is potentially located. Consequently, the effectiveness of the regional proposal method and the efficiency of the classification can be increased.

The prior information is generated outside the convolutional neural network. The generation can be carried out, for example, by means of an external sensor, e.g. by a radar sensor, a lidar sensor or an ultrasonic sensor, by an infrared camera or by a laser scanner. Alternatively, the image captured by the capturing unit, e.g. by the camera, can also be processed, for example, by means of a unit which is located outside the network architecture (the convolutional neural network), and the result of the processing (the prior information) can be supplied to the convolutional neural network.

As a result, the additional prior information can be made available to both the region proposal stage and the classification stage. The prior information can be made available to all or only selected layers within the convolutional neural network as additional information.

The object-specific information of the prior information, e.g. locality, temporal change/dependence and/or further information from sensors in the form of a prior (vector, matrix or similar representation form), contributes to improving the detection rate and saving computation time.

A scoring algorithm of the region proposal method can in particular be improved in that the scores are not only based on the extracted image features, but also on the external prior information which includes, for example, the position of the object in the image and/or temporal information. Furthermore, it is made possible that objects which are wrongly suppressed by the region proposal stage are reinforced by the prior information and, as a result, the so-called "false negative" rate is decreased. Within the framework of the classification, object classes can be better allocated based on the additional information, as a result of which the number of falsely detected objects can be reduced, for example.

The prior information can be deployed in the convolutional neural network at various points. It is thus possible to introduce the prior information directly into the network as one or more additional layers. Furthermore, a deployment in at least one additional feature map is possible, which can be utilized both during training and during testing, e.g. as an additional feature map in one layer or in multiple layers of the network. In particular, the prior information can be integrated into a last common layer of the convolutional neural network. This makes it possible for a number of regions to be evaluated by the classification stage to be reduced.

The prior information can be additionally combined with a graphical model at any point in the convolutional neural network. The prior information does not change learned weights of the convolutional neural network. For example, the prior information can be integrated/inserted directly behind the region proposal stage, in order to change the score of the windows.

According to a first embodiment, the prior information is inserted into at least one layer of the convolutional neural network, and the at least one layer having the prior information is supplied to the region proposal method in order to locate the object region. For example, the prior information can be inserted into a fifth convolutional layer of a ZF network, and the fifth convolutional layer having the prior information is then supplied to the region proposal stage in order to locate the object region.

According to an alternative second embodiment, the prior information is supplied immediately i.e. directly to the region proposal method in order to locate the object region.

According to the first and the second embodiment, it can furthermore be provided that the prior information is forwarded to a classifier for classifying (as a result of which the identification accuracy can be further increased)—or not (as a result of which the computational cost can be lowered).

The prior information is intended, in a first step, to lead the region proposal method embedded in the convolutional neural network to the correct objects. To this end, object regions are determined, which can belong to an object. There is a position in the image for these object region proposals, but the prior information does not know or respectively does not contain any information regarding whether a proposed object region is an object or something else.

According to a further embodiment, the prior information can, in this sense, contain at least one of the following pieces of information: location information regarding a possible object region, in particular a global position of the possible object region in the image (wherein the prior information can be calculated globally in that the entire image captured by the camera is observed), environmental information of the possible object region, a temporal change in the possible object region in a sequence of images captured by the camera (for example, the prior information can include the fact that an object region is moving in a specific direction from image to image, e.g. from left to right or from the top down, or that an object region is changing its color from image to image), a temporal dependence of the possible object region in a sequence of images captured by the camera (e.g. the behavior of the object region in the course of the sequence of images, in particular how the object region reacts with its environment; for example, the representation of a vehicle which is moving away from the camera from image to image can reduce in size), and can include information from a sensor other than the camera.

The region proposal method which is embedded in the convolutional neural network is notified by the prior information that a possible object region differs from other object regions, and that it is worth performing a classification in the possible object region. Initially, it is not known what kind of an object could be classified in the possible object region, nor is this relevant. However, the prior information supplies the convolutional neural network with the information that something interesting is located within the possible object region, such that the possible object region is subsequently located by the region proposal method as an object region, and the classification is subsequently performed in the located object region.

The prior information, in particular location information ("location prior" information), can assume one or more of the forms indicated below: the prior information can be indicated or calculated for each image. Furthermore, the prior information can be stipulated for each environment in which the classifier is working. The prior information can additionally be prescribed (fixed "region of interest") or can be specific for each class of object. Generic prior information (such as, for example, attention maps) is also possible. In addition, the prior information can be calculated from other sensors such as, for example radar, high flash LIDAR, infrared camera or ultrasound. The prior information can also consist of temporal information such as, for example, a change or a dependence. Furthermore, prior information can be calculated from a combination of all or individually indicated pieces of information.

A probability that an object is located at a specific point within the image can be calculated, for example, based on the following information: sensors, attention model or image features.

According to a second aspect of the invention, a device is provided which comprises a capturing unit, e.g. a camera, and means, in particular a processor unit, which are set up to carry out the steps of the method according to the first aspect of the invention.

According to a third aspect of the invention, a vehicle is provided which comprises a device according to the second aspect of the invention. The vehicle is, for example, a motor vehicle such as a car, bus or truck, but also for example an aircraft, e.g. an airplane, or a rail vehicle, e.g. a train or a tram, or a watercraft, e.g. a ship or boat.

According to a fourth aspect of the invention, a computer program is provided which comprises commands which, during the running of the computer program by the device, prompt said device to carry out the steps of a method according to the first aspect of the invention.

According to a fifth aspect of the invention, a computer-readable medium, e.g. a computer-readable data medium, is provided, on which the computer program according to the fourth aspect of the invention is stored.

The invention according to the present application makes it possible for the so-called "false-positive" rate to be improved. Furthermore, a decrease in the computation time is made possible, since the classifier only carries out its feature extraction in regions in which an object of a desired class is in all probability to be found.

In particular, camera-based driver assistance systems benefit from the present invention, since the detection of objects in difficult scenes can be improved. For example, a detection of faraway vehicles can be substantially improved by the prior information which can, in particular, include environment, localization and time information. Erroneous detection of cars in the sky or in areas with trees can be minimized or respectively excluded with the aid of the prior information, in particular in those areas where a drivable area is located in the image. In addition, the detection range can be extended to further distances.

The present invention can also be used in other architectures of neural networks or respectively in a sequencing. The teaching according to the invention can be utilized for the representation/display of potential objects. In particular, the invention can be used in the field of robotics for machine vision and, especially, for ADAS. The same applies to signal processing from medical technology. The invention can be additionally utilized directly in conjunction with thermal images, ultrasound images, radar images, magnetic resonance signals, near infrared spectroscopy or computed tomography. The invention can also be used with monitoring systems as well as radar antennae, synthetic aperture radar and laser scanners. In addition, the invention can be used in industrial analysis and inspection. In addition, the invention can be used in any combination of the technologies indicated above.

BRIEF DESCRIPTION OF THE DRAWINGS

Exemplary embodiments of the invention are explained in greater detail below, with reference to the schematic drawing, wherein.

DETAILED DESCRIPTION OF EXAMPLE EMBODIMENTS OF THE INVENTION

Figure 1:
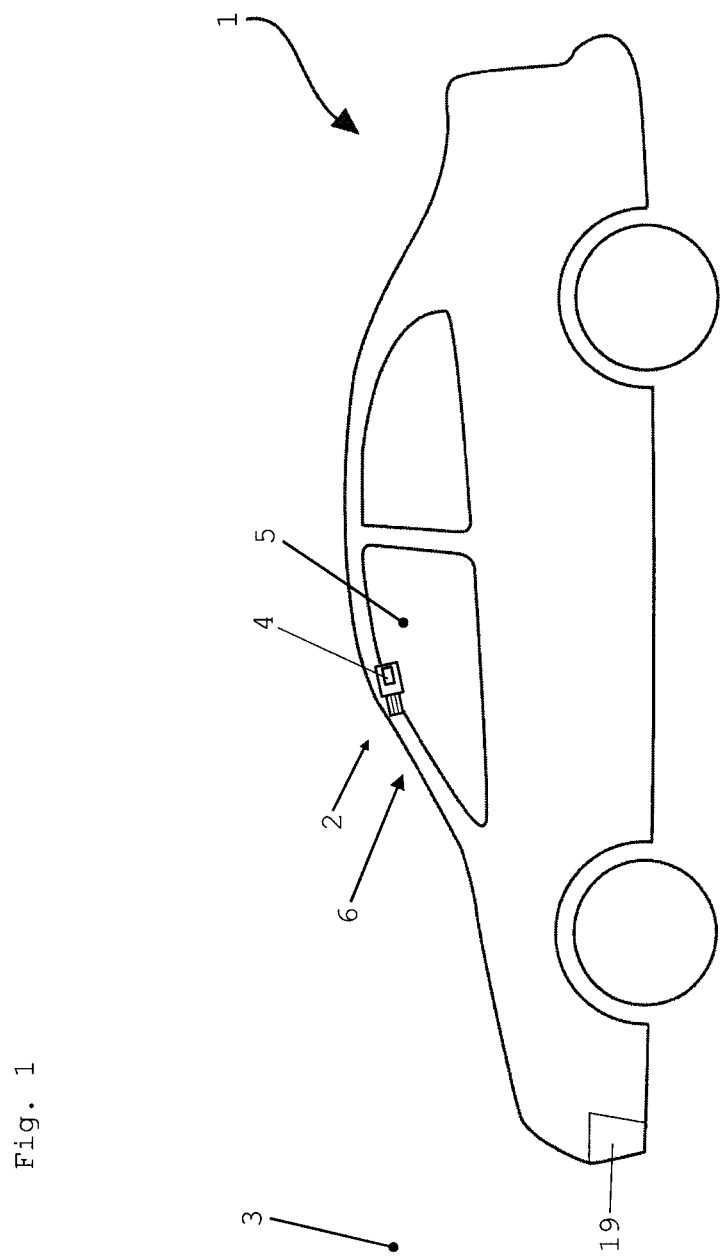
FIG. 1 shows a side view of a vehicle having an exemplary embodiment of a device according to the invention.

FIG. 1 shows a vehicle 1 in the form of a car. The vehicle 1 comprises a capturing unit in the form of a camera 2 for acquiring an external environment 3 of the vehicle. The camera 2 additionally comprises a processor unit 4 and is arranged in an internal space 5 of the vehicle 1 and, indeed, in particular in an area behind a windshield 6 of the vehicle 1. This is, however, purely indicated by way of example. Likewise, a mounting on a back window of the vehicle 1 with a viewing direction backward can, for example, also be provided. Multiple individual external shots or respectively images 7 (cf. FIG. 6) of the external environment of the vehicle 1 can be captured through the windshield 6 by means of the camera 2, wherein the multiple images are taken consecutively in time and form a series of images of the external environment 3 of the vehicle 1.

Figure 4:
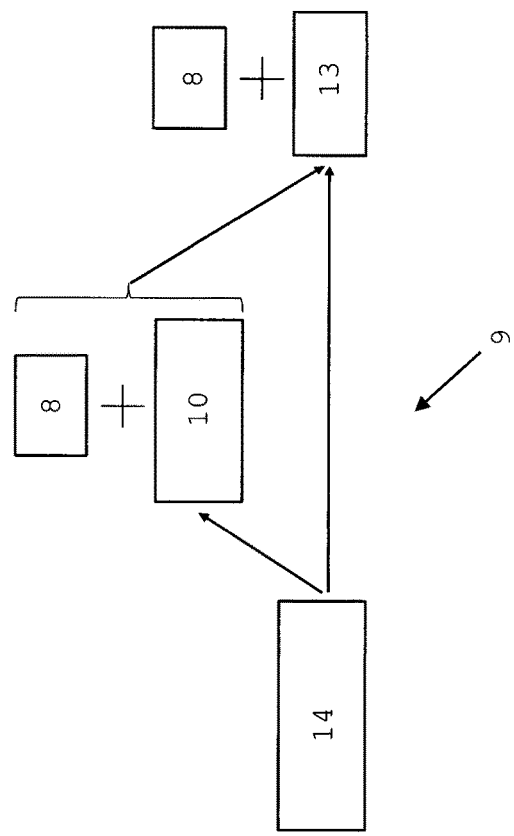
FIG. 4 shows a third possible insertion position of prior information in a tool chain for identifying objects in an image of a camera.
Figure 5:
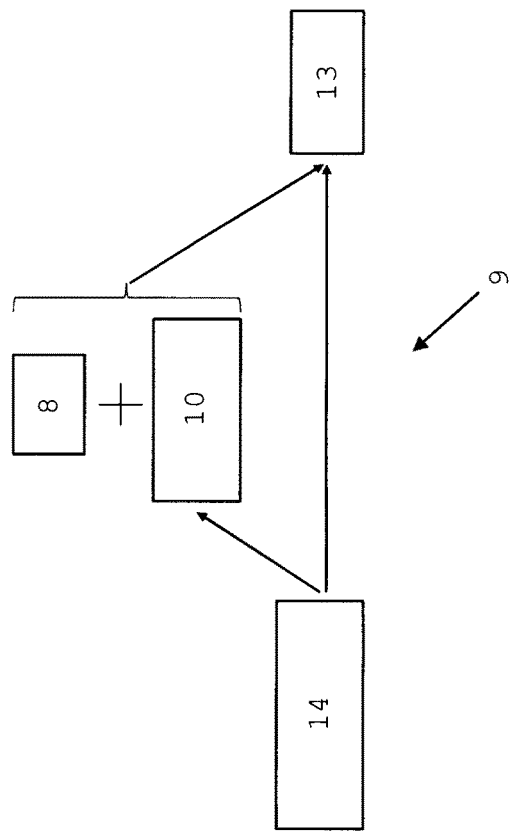
FIG. 5 shows a fourth possible insertion position of prior information in a tool chain for identifying objects in an image of a camera.
Figure 6:
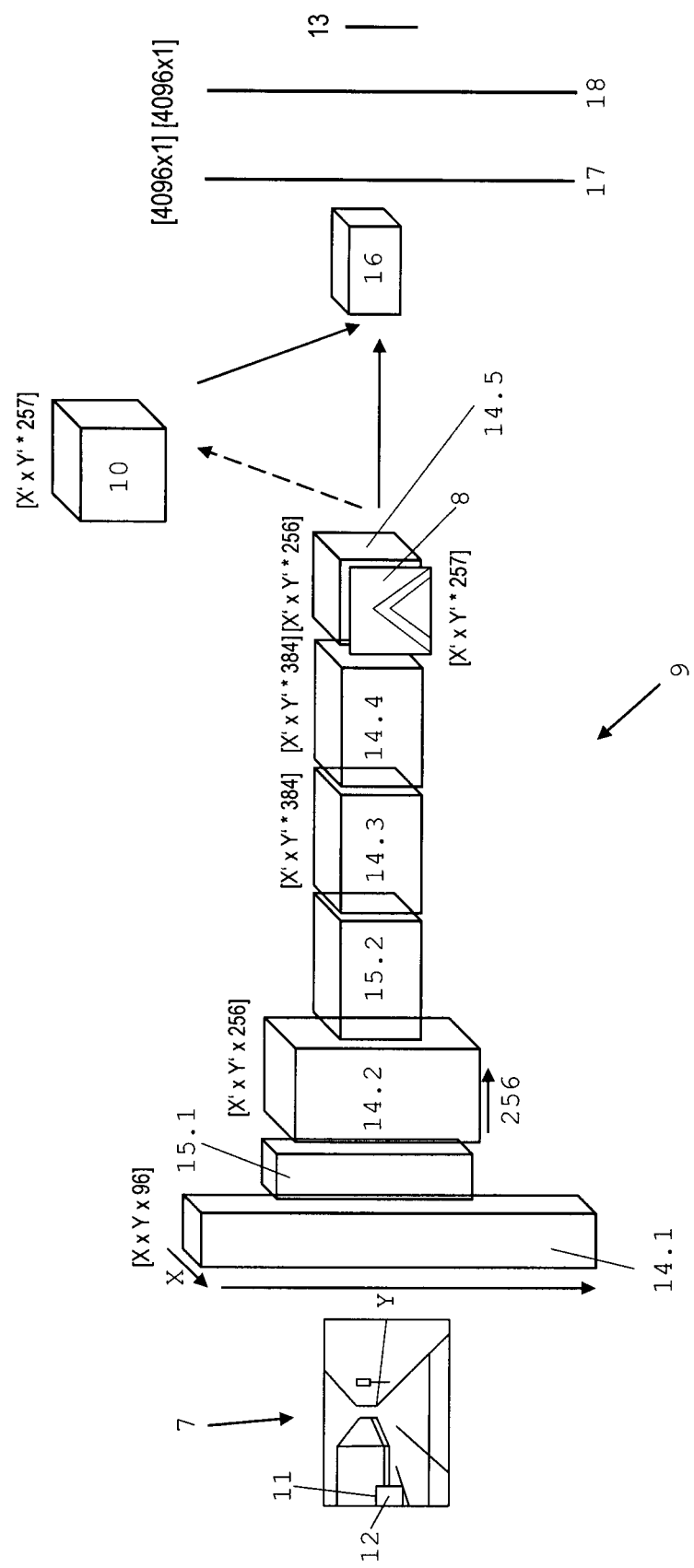
FIG. 6 shows a fifth possible insertion position of prior information in a tool chain for identifying objects in an image of a camera.

FIGS. 2 to 6 show possible positions for inserting at least one piece of external prior information 8 in a tool chain 9 or respectively within a method for identifying objects in an image of the camera 2. The prior information can be, for example, global location information of an object which is to be detected, wherein the location information can originate, for example, from a radar sensor 19 of the vehicle 1. The tool chain 9 comprises a region proposal network 10 or respectively a region proposal stage for locating object regions within the image by means of a region proposal method. FIG. 6 shows, by way of example, an object region 11 within the image 7. An object 12 which is to be detected (not represented in greater detail), e.g. a vehicle, can be depicted within the image region 11.

Furthermore, the tool chain 9 comprises a classification stage 13 for classifying the object 12 within the object region 11. In the exemplary embodiments shown, the region proposal network 10 and the classification stage 13 are integrated into a convolutional neural network (CNN) which comprises multiple convolutional layers 14 in particular.

Figure 2:
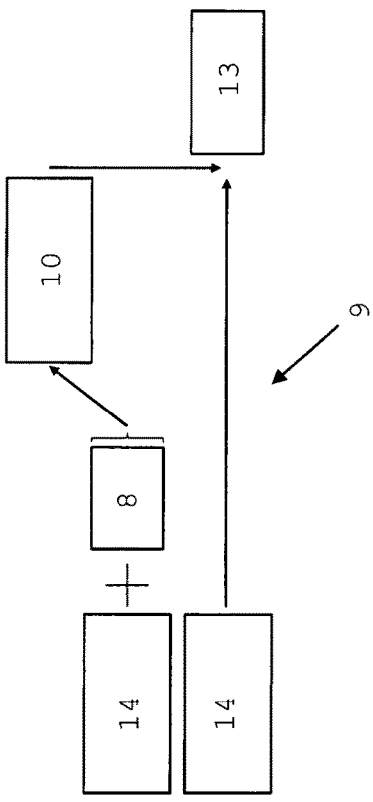
FIG. 2 shows a first possible insertion position of prior information in a tool chain for identifying objects in an image of a camera.

According to FIG. 2, prior information 8 highlighting the object region 11, within which the object 12 is located, is inserted into a convolutional layer 14 of the convolutional neural network. The convolutional layer 14 having the prior information 8 is supplied to the region proposal network 10 in order to locate the object region 11. The identified object region 11 is supplied to the classification stage 13. In order to classify the object 12 within the object region 11, the convolutional layer 14 having the prior information 8 is furthermore forwarded to the classification stage 13.

Figure 3:
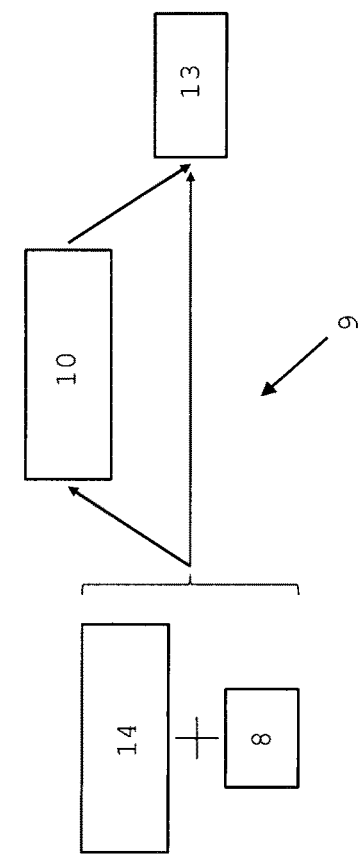
FIG. 3 shows a second possible insertion position of prior information in a tool chain for identifying objects in an image of a camera.

According to FIG. 3, prior information 8 highlighting the object region 11, within which the object 12 is located, is inserted into a convolutional layer 14 of the convolutional neural network. The convolutional layer 14 having the prior information 8 is supplied to the region proposal network 10 in order to locate the object region, however—deviating from the example in accordance with FIG. 2—it is not forwarded to the classification stage 13. The identified object region 11 and—in order to classify the object 12 within the object region 11—a convolutional layer 14 without the prior information 8 are supplied to the classification stage 13.

According to FIG. 4, prior information 8 highlighting the object region 11, within which the object 12 is located, is inserted at any point in the region proposal network 10 in order to locate the object region 11. The identified object region 11 and—in order to classify the object 12 within the object region 11—a convolutional layer 14 without the prior information 8 are supplied to the classification stage 13.

According to FIG. 5, prior information 8 highlighting the object region 11, within which the object 12 is located, is inserted into the region proposal network 10 at any point in order to locate the object region 11. The identified object region 11 and—in order to classify the object 12 within the object region 11—a convolutional layer 14 as well as the prior information 8 are supplied to the classification stage 13.

FIG. 6 shows a ZF network having five convolutional layers 14.1 to 14.5, having a first pooling layer 15.1 between a first convolutional layer 14.1 and a second convolutional layer 14.2, having a second pooling layer 15.2 between the second convolutional layer 14.2 and a third convolutional layer 14.3, having a normalization layer 16 as well as having two fully connected layers 17 and 18 prior to the classification stage 13.

The prior information 8 highlighting the object region 11, within which the object 12 is located, is inserted into the fifth convolutional layer 14.5 of the ZF network according to the exemplary embodiment in accordance with FIG. 6, wherein the fifth convolutional layer 14.5 having the prior information 8 is subsequently supplied to the region proposal stage 10 in order to locate the object region 11. The prior information 8 is not forwarded to the classification stage 13.

The invention claimed is:

1. A method comprising:
   capturing an image of an external environment of a vehicle using a capturing unit arranged on the vehicle;
   producing image data of the image;
   obtaining prior information, wherein the prior information comprises at least one of a location information and a temporal information, which relate to a probability that a possible interesting object is located at a particular location within the image, and wherein the prior information defines a possible object region containing the possible interesting object;
   supplying the image data and the prior information to a region proposal process;
   in the region proposal process, locating and identifying a selected object region in the image data, with consideration of the possible object region defined by the prior information, wherein the consideration of the possible object region increases a probability that the region proposal process locates and identifies the possible object region as the selected object region in the image data when the region proposal process evaluates the image data; and
   in an object classification process, classifying a selected object in the selected object region in the image data;
   wherein at least one of the region proposal process and the object classification process is implemented in a convolutional neural network.

2. The method according to claim 1, wherein the region proposal process is implemented in the convolutional neural network.

3. The method according to claim 1, wherein both the region proposal process and the object classification process are implemented in the convolutional neural network.

4. The method according to claim 1, wherein the obtaining of the prior information comprises at least one of generating and processing the prior information outside of the convolutional neural network.

5. The method according to claim 1, wherein the prior information is not supplied to the object classification process and is not taken into consideration in the classifying of the selected object.

6. The method according to claim 1, further comprising supplying the prior information also to the object classification process, and taking the prior information into consideration in the classifying of the selected object.

7. The method according to claim 6, wherein the supplying of the prior information to the object classification process comprises supplying the prior information from outside of the convolutional neural network directly to the object classification process.

8. The method according to claim 6, wherein the supplying of the prior information to the object classification process comprises inserting the prior information into at least one layer of the convolutional neural network, and supplying the at least one layer, into which the prior information has been inserted, to the object classification process.

9. The method according to claim 1, wherein the supplying of the prior information to the region proposal process comprises supplying the prior information from outside of the convolutional neural network directly to the region proposal process.

10. The method according to claim 1, wherein the supplying of the prior information to the region proposal process comprises inserting the prior information into at least one layer of the convolutional neural network, and supplying the at least one layer, into which the prior information has been inserted, to the region proposal process.

11. The method according to claim 1, wherein the prior information further comprises environmental information of the possible object region.

12. The method according to claim 1, wherein the prior information comprises sensor data provided by a sensor other than the capturing unit.

13. The method according to claim 1, further comprising calculating the probability that the possible interesting object is located at the particular location within the image.

14. A device for performing the method according to claim 1, comprising the capturing unit configured to capture the image, and a processor arrangement configured to perform the region proposal process and the object classification process.

15. A vehicle comprising the device according to claim 14 and a vehicle body on which the device is arranged.

16. A non-transitory computer-readable medium on which is stored a computer program that comprises commands which, when executed by a processor arrangement, cause the method according to claim 1 to be performed.

17. A method comprising:
capturing an image of an external environment of a vehicle using a capturing unit arranged on the vehicle;
producing image data of the image;
obtaining prior information, wherein the prior information comprises at least one of a location information and a temporal information, which relate to a probability that a possible interesting object is located at a particular location within the image, and wherein the prior information defines a possible object region containing the possible interesting object;
pre-processing the image data and then supplying the image data and the prior information to a region proposal process;
in the region proposal process, locating and identifying a selected object region in the image data, with consideration of the possible object region defined by the prior information; and
in an object classification process, classifying a selected object in the selected object region in the image data;
wherein at least one of the region proposal process and the object classification process is implemented in a convolutional neural network.

18. A method comprising:
capturing an image of an external environment of a vehicle using a capturing unit arranged on the vehicle;
producing image data of the image;
obtaining prior information relating to a probability that a possible interesting object is located at a particular location within the image, wherein the prior information defines a possible object region containing the possible interesting object, and wherein the prior information comprises at least one of: a location information comprising a global position of the possible object region in the image, a temporal information identifying a temporal change in the possible object region over a sequence of a plurality of the image captured by the capturing unit, and a temporal information identifying a temporal dependence of the possible object region in a sequence of a plurality of the image captured by the capturing unit;
supplying the image data and the prior information to a region proposal process;
in the region proposal process, locating and identifying a selected object region in the image data, with consideration of the possible object region defined by the prior information; and
in an object classification process, classifying a selected object in the selected object region in the image data;
wherein at least one of the region proposal process and the object classification process is implemented in a convolutional neural network.

19. The method according to claim 18, wherein the prior information comprises the location information comprising the global position of the possible object region in the image.

20. The method according to claim 19, wherein the location information is calculated globally in that an entirety of the image captured by the capturing unit is taken into consideration.

21. The method according to claim 18, wherein the prior information comprises the temporal information identifying the temporal change in the possible object region over the sequence of the plurality of the images.

22. The method according to claim 18, wherein the prior information comprises the temporal information identifying the temporal dependence of the possible object region in the sequence of the plurality of the images.

* * * * *

UNITED STATES PATENT AND TRADEMARK OFFICE
CERTIFICATE OF CORRECTION

PATENT NO. : 11,132,563 B2  
APPLICATION NO. : 16/476378  
DATED : September 28, 2021  
INVENTOR(S) : Ann-Katrin Fattal et al.

Page 1 of 1

It is certified that error appears in the above-identified patent and that said Letters Patent is hereby corrected as shown below:

On the Title Page

Item (73), Assignees:
Line 1, after "Conti", replace "Ternie" with --Temic--.

Signed and Sealed this
Twenty-fifth Day of January, 2022

Drew Hirshfeld
*Performing the Functions and Duties of the*
*Under Secretary of Commerce for Intellectual Property and*
*Director of the United States Patent and Trademark Office*